Figure 1:
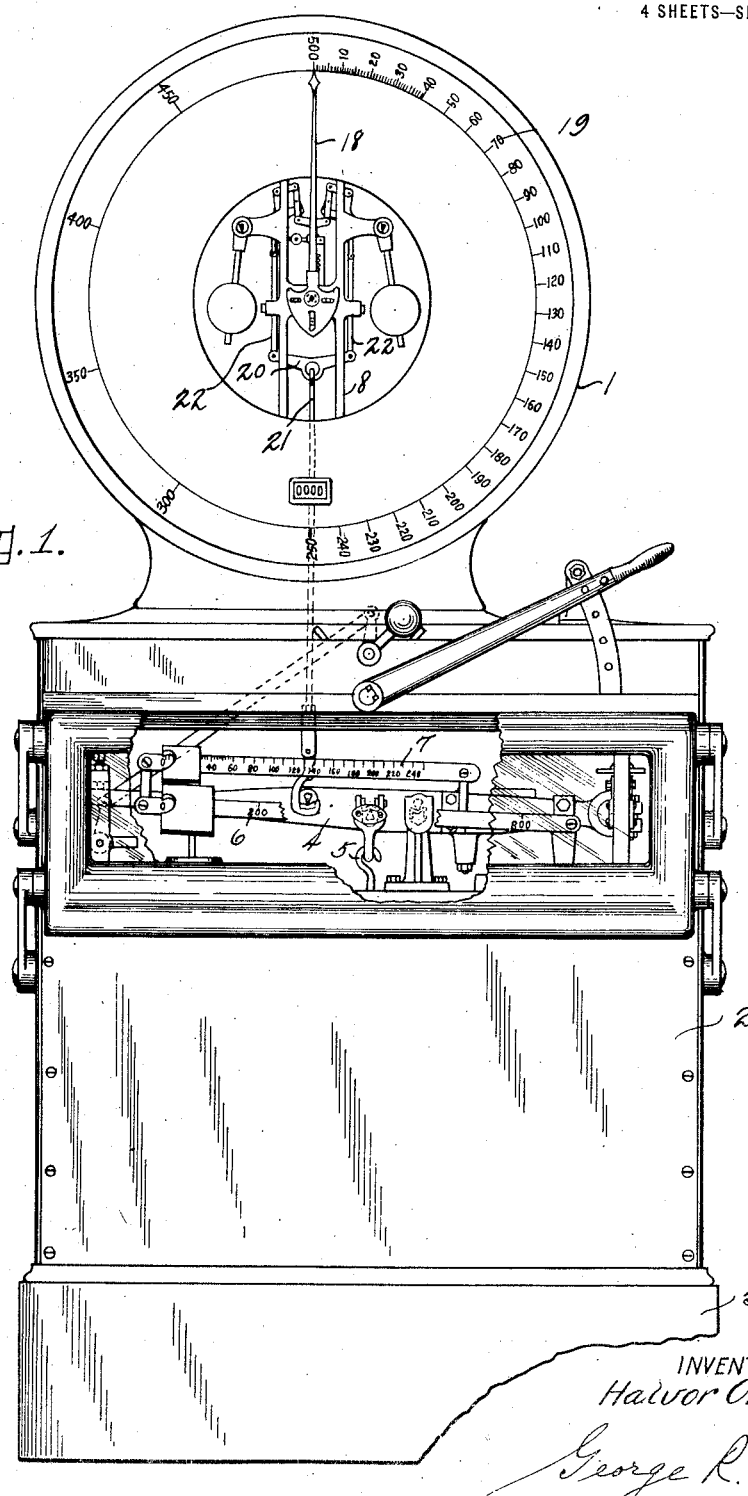

H. O. HEM.
PENDULUM WEIGHING SCALE.
APPLICATION FILED DEC. 21, 1916.

1,360,213.

Patented Nov. 23, 1920.
4 SHEETS—SHEET 1.

INVENTOR.
Halvor O. Hem by George R. Frye.
Atty.

H. O. HEM.
PENDULUM WEIGHING SCALE.
APPLICATION FILED DEC. 21, 1916.

1,360,213.

Patented Nov. 23, 1920.
4 SHEETS—SHEET 2.

INVENTOR.
Halvor O. Hem
George R. Frye.
Atty
By

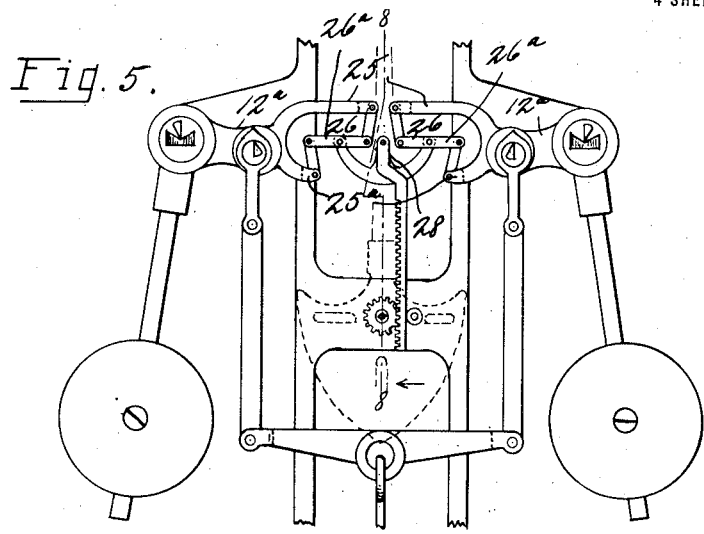
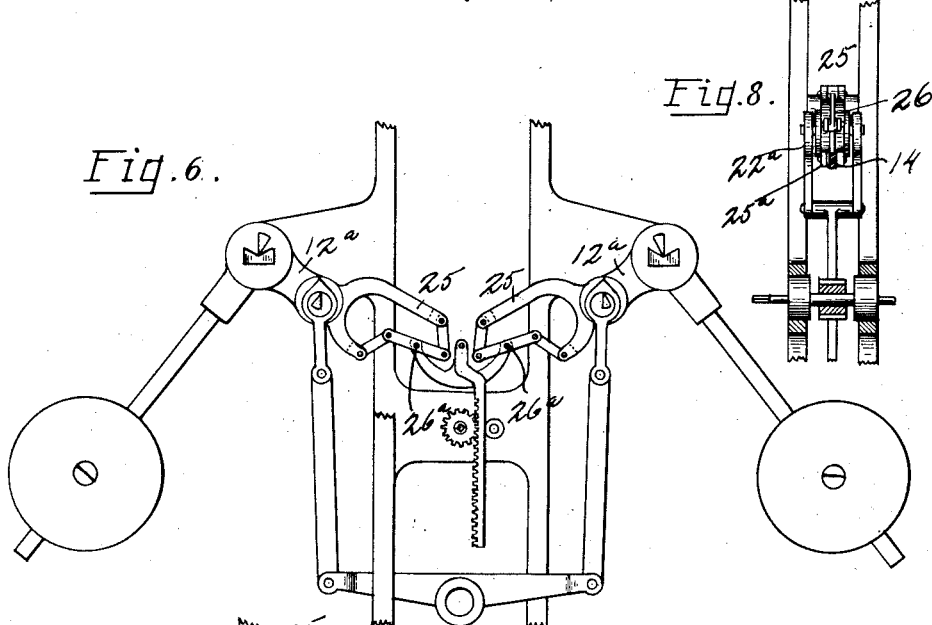
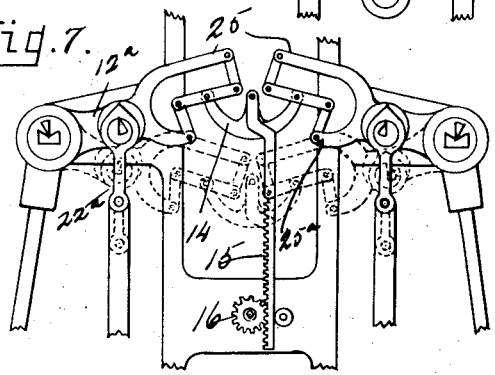

H. O. HEM.
PENDULUM WEIGHING SCALE.
APPLICATION FILED DEC. 21, 1916.

1,360,213.

Patented Nov. 23, 1920.
4 SHEETS—SHEET 4.

INVENTOR.
Halvor O. Hem.
George R. Frye
Atty.
by

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

PENDULUM WEIGHING-SCALE.

1,360,213.  Specification of Letters Patent.  Patented Nov. 23, 1920.

Application filed December 21, 1916. Serial No. 138,197.

*To all whom it may concern:*

Be it known that I, HALVOR O. HEM, a citizen of the United States, residing at Toledo, in the county of Lucas and State of Ohio, have invented certain new and useful Improvements in Pendulum Weighing-Scales, of which the following is a specification.

This invention relates to pendulum weighing scales and more specifically to the weighing mechanism thereof.

One of the characteristics of pendulum scales having fixed bearings and a link and pivot connection with the main lever is that as the pendulum weight swings outwardly and the pivot and link move downwardly, step by step, the leverage of the pendulum gradually changes and the movement of the indicator over the chart is not uniform.

This invention has for its primary object to overcome the objection to scales of this type and enable the use of pendulums resting in fixed bearings and positively connected to the actuating levers with evenly graduated indicating charts by providing means for uniformly driving the index hand from the pendulums despite the uneven movement of the pendulums as successive increments are added to the load.

Other objects and advantages will readily appear from the following description, wherein preferred embodiments of my invention are described and particularly pointed out in the subjoined claims.

Reference is had to the accompanying drawings illustrating preferred embodiments of the invention and wherein similar reference numerals designate similar parts throughout the several views.

In the drawings:—

Figure 2:
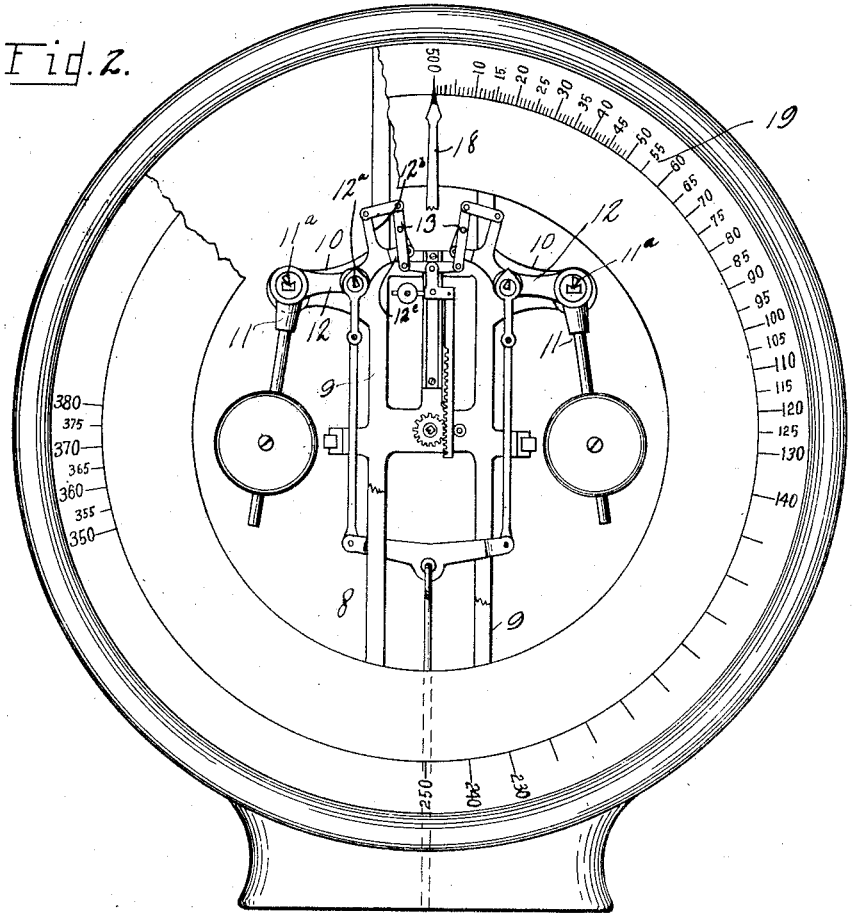
Figure 3:
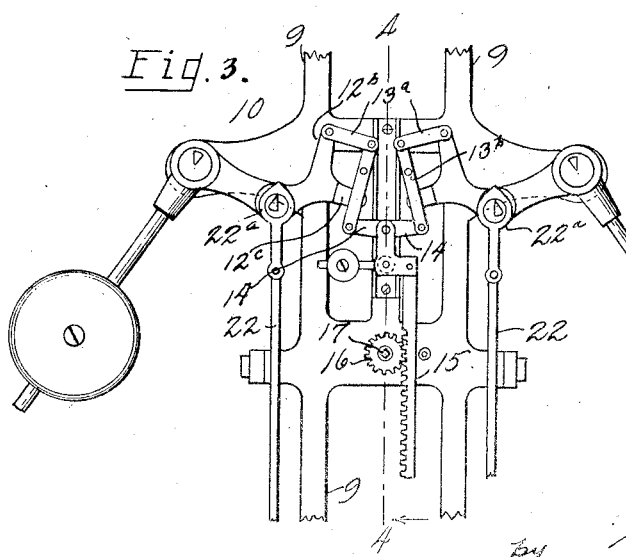
Figure 4:
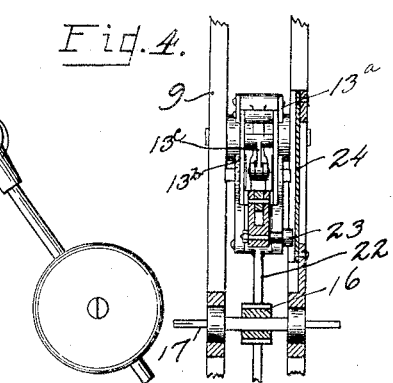
Figure 9:
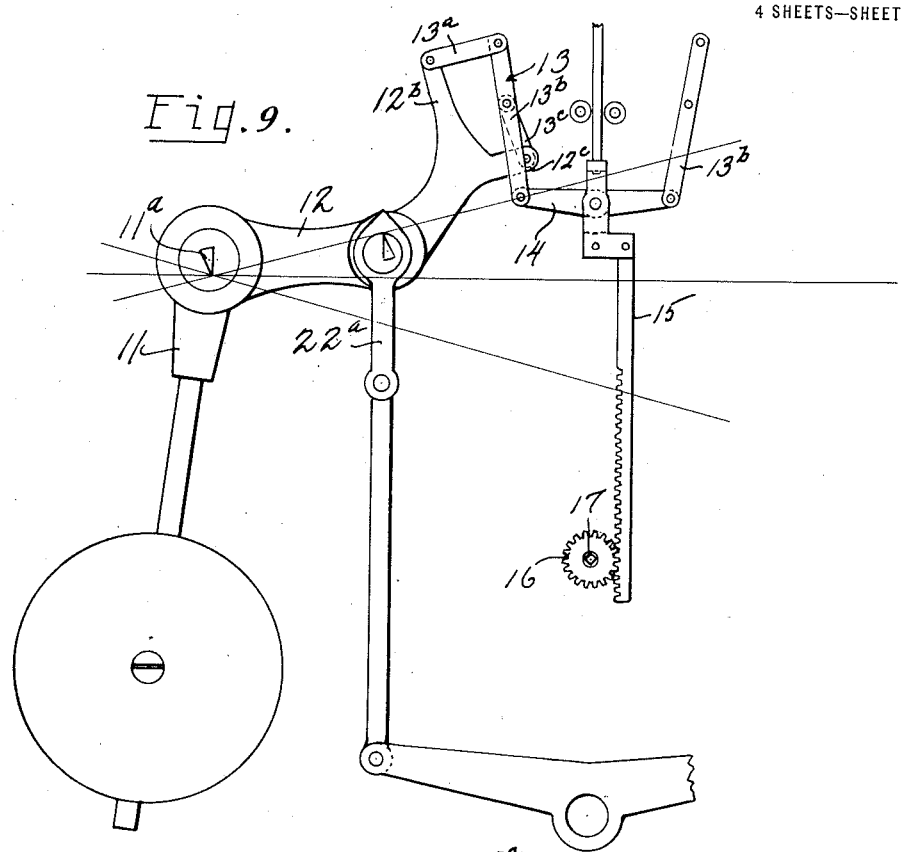
Figure 10:
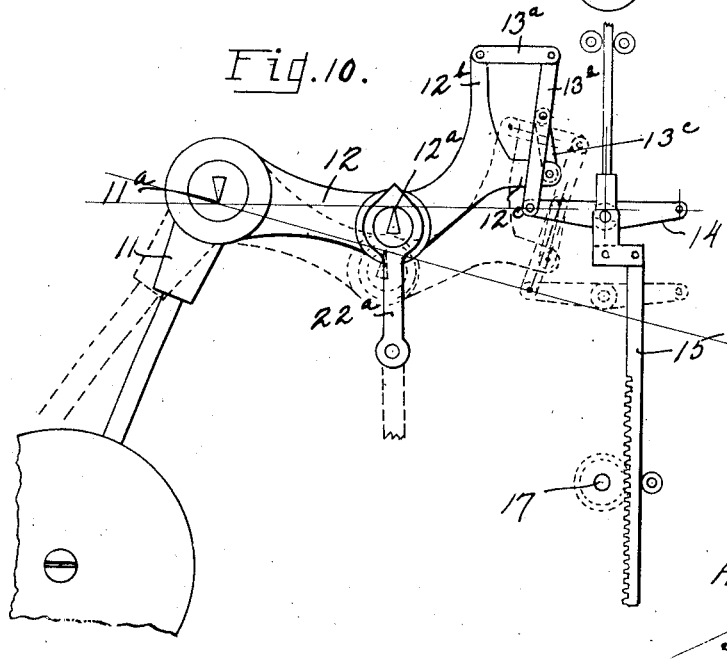

Figure 1 is a front elevation, partly broken away, of a scale equipped with my invention; Fig. 2 is an enlarged front elevation of my improved weighing mechanism within the housing of a scale, showing the mechanism in its normal position; Fig. 3 is an enlarged front elevation of the mechanism in an intermediate position; Fig. 4 is a vertical sectional view taken on the line 4—4 of Fig. 3; Fig. 5 is a front elevation of a slightly modified form of my invention; Fig. 6 is a similar view thereof in a different position; Fig. 7 is a diagrammatic view thereof showing the mechanism in full lines in its normal position and in dotted lines in an intermediate position; Fig. 8 is a vertical sectional view taken on the line 8—8 of Fig. 5; Fig. 9 is an enlarged diagrammatic view of a portion of my invention in normal position; and Fig. 10 is a similar view thereof shown in other positions assumed during the weighing operations.

Referring more particularly to the drawings, I have shown my invention applied to scales adapted to weigh comparatively heavy loads, and comprising a housing 1 forming an inclosure for the weighing mechanism and supported upon a suitable casing 2, said casing being mounted upon a base 3 carrying the usual platform and platform levers (not shown). A main lever 4 fulcrumed within the casing 2 is connected to the platform levers by means of a lower steelyard 5 and carries tare and increased capacity beams 6 and 7 respectively, of any familiar type. My improved weighing mechanism comprises a frame 8 securely mounted within the housing 1 and consisting of substantially four vertically-disposed pillars 9. Each of the pillars 9 is provided with supporting bearings 10 for receiving the fulcrum pivots $11^a$ of the pendulums 11 formed with inwardly projecting arms 12 carrying knife pivots $12^a$ intermediate their ends and terminating in bifurcated members $12^b$ and $12^c$, to the ends of which are pivoted suitable linkage members 13 comprising a link $13^a$ pivoted to the member $12^b$ having a link $13^b$ pivoted to the end thereof and adapted to normally rest in substantially right angles thereto. This link $13^b$ is connected to the member $12^c$ at a point intermediate its ends by means of a short link $13^c$. The lower ends of the link $13^b$ are connected to the opposite ends of an equalizer bar 14 supporting a downwardly-depending rack-bar 15 meshing with a pinion 16 keyed upon a shaft 17 journaled in the frame 8, and drives the index hand 18 over the evenly graduated indicating chart 19. An equalizer bar 20 is centrally connected to the main lever 4 by the upper steelyard 21, and its opposite arms are connected to the pendulums 12 by means of links 22 pivoted at their upper ends to the stirrups $22^a$ engaging the knife pivots $12^a$. The rack 15 is maintained in a vertical position throughout its entire movement, and preferably means are provided for guiding the rack in this vertical movement. In Figs. 2 and 3 I have shown a roller 23 mounted on the rack and adapted to travel between the side walls of a channel-shaped guide member 24 mounted vertically upon the framework of the scale. This roller is of substantially the same diameter as the distance between the side walls of the channel, and serves to prevent any tendency of the rack-bar to swing laterally during its vertical movements.

In operation, when a load is placed upon the platform of the scale a pull is exerted through the various scale levers to the equalizer bar 20 and is then transmitted to the arms 12 of the pendulums 11 through the links and stirrups 22 and 22$^a$, whereby the pendulum weights are elevated sufficiently to offset the weight of the load, and the bifurcated ends 12$^a$ of the pendulum arms are pulled downwardly and carry with them the linkage members 13, the equalizer bar 14, and the rack-bar 15 to operate the indicating mechanism of the scale. The rack 15 is restrained to travel in a vertical line by reason of its mounting and the channel guide and roller hereinbefore referred to. The points of connection of the equalizer bar 14 with the linkage members 13 are also restrained to travel in vertical lines parallel with the point of connection of the rack with the equalizer bar 14. Also, it will be noted that the points of engagement of the linkage members with the equalizer bar 14 are always in direct alinement with the pivotal points of the fulcrum pivots 11$^a$ and the knife pivots 12$^a$ of the pendulums. This relation is maintained at all angular positions of the pendulum, as can best be seen by reference to the diagrammatic views 9 and 10, and it is the maintenance of the points of connection of the linkage members with the equalizer bar in direct alinement with the pendulum pivot edges and also in vertical alinement with the rack-bar that effects the governing control which regulates the uniform movement of the rack-rod. Thus, as shown in Figs. 9 and 10, the pendulum arm 12 is shown as moving from its normal position (Fig. 9) to the central position (full lines in Fig. 10) where the line connecting the pivot edges and the linkage members and equalizer bar is horizontal, and then a similar distance on the other side of such central line (dotted lines in Fig. 10). These are the extreme positions of movement in the modification herein illustrated, and it will be noted that in each of them the three points referred to are always in direct alinement, and simultaneously the point of connection of the linkage members and equalizer bar travels in a true vertical line. The relation that is maintained can be expressed with reference to the horizontal line as follows: The distance between the fulcrum pivot and the point of connection of the linkage members with the equalizer bar varies as the secant of the angle traversed by the arm 12 on either side of the horizontal position. It is to be understood that while the horizontal line connecting the pivot edges is shown as the central position of the pendulums, the pendulums need not always be so arranged. If the pendulums swing through a greater arc on one side of the horizontal line than on the other, or if they swing entirely on one side of the horizontal line, the relation still exists, the distance between the fulcrum pivot and point of connection with the equalizer bar varying always as the secant of the angle traversed by the pendulum arm on either side of the horizontal line. When this relation is maintained, the rack is controlled to move uniformly in a vertical direction despite the decrease in leverage of the pendulums during their travel.

Referring to the modification illustrated in Figs. 5–8 inclusive, the bifurcated members 12$^a$ of the pendulums are provided with parallel arms 25 and 25$^a$, the arm 25 being of the greater length, these arms carrying linkage members 26 substantially similar to those shown in Figs. 2 and 3 but arranged at right angles thereto. The equalizer bar in this modification that connects the rack with the linkage members is semi-circular in shape, and its ends are pivotally connected to intermediate points on the central links 26$^a$, the rack being connected with a central projection 28. Though the connection to the rack bar is not made at the same point in the linkage members as in the first described modification, the same result is obtained for the reason that the point of connection of this equalizer bar with the linkage member is in direct alinement with the pivotal edges of the pendulum pivots. This modification merely illustrates that the linkage members can be normally arranged vertically or horizontally or at any intermediate position, and the connection therefrom to the equalizer bar carrying the rack-rod can be made at either the end of the central link or at an intermediate point thereon and the desired result will be secured, provided the points of connection of this equalizer bar with the linkage members are in direct alinement with the pendulum pivots.

In Figs. 9 and 10 a modified form of guide member for the rack-bar is shown, the rack-bar carrying an upwardly-projecting vertically-disposed guide bar 31 which engages spaced guide rollers 32 to maintain the rack-bar vertical at all times.

While it will be apparent that the illustrated embodiments of the invention herein disclosed are well calculated to adequately fulfil the objects primarily stated, it is to be understood that the invention is susceptible to variation, modification and change without departing from the spirit and scope of the invention as set forth in the subjoined claims.

Having described my invention, I claim:

1. In a weighing scale, the combination of a pendulum fulcrumed upon fixed bearings, indicating means including a rack, and flexible means carried by the pendulum and connecting the pendulum and rack whereby the rack is controlled to move uniformly during the rocking of the pendulum as successive increments are weighed upon the scale.

2. In a weighing scale, the combination of a pendulum fulcrumed upon fixed bearings, indicating means including a rack, and a plurality of links carried by the pendulum and connecting the pendulum and rack whereby the rack is controlled to move uniformly during the rocking of the pendulum as successive increments are weighed upon the scale.

3. In a weighing scale, the combination of a two-armed pendulum fulcrumed upon fixed bearings, indicating means including a rack, and a plurality of links arranged upon one arm of the pendulum and pivotally connected to each other and to the pendulum and rack whereby the rack is controlled to move uniformly during the rocking of the pendulum as successive increments are weighed upon the scale.

4. In a weighing scale, the combination of a two-armed pendulum fulcrumed upon fixed bearings, indicating means including a rack, and a system of pivotally connected links arranged upon one arm of the pendulum and joining the pendulum and rack whereby the rack is controlled to move uniformly during the rocking of the pendulum as successive increments are weighed upon the scale.

5. In a weighing scale, the combination of a pair of opposed pendulums fulcrumed upon fixed bearings, indicating means including a rack, and flexible means carried by the pendulums and connecting the pendulums and rack whereby the rack is controlled to move uniformly during the rocking of the pendulums as successive increments are weighed upon the scale.

6. In a weighing scale, the combination of a pair of opposed pendulums fulcrumed upon fixed bearings, indicating means including a rack, and a plurality of links carried by the pendulums and connecting the pendulums and rack whereby the rack is controlled to move uniformly during the rocking of the pendulums as successive increments are weighed upon the scale.

7. In a weighing scale, the combination of a pair of opposed two-armed pendulums fulcrumed upon fixed bearings, indicating means including a rack, and a plurality of links arranged upon one arm of each of the pendulums and pivotally connected to each other and to the pendulums and rack whereby the rack is controlled to move uniformly during the rocking of the pendulums as successive increments are weighed upon the scale.

8. In a weighing scale, the combination of a pair of opposed two-armed pendulums fulcrumed upon fixed bearings, indicating means including a rack, and a system of pivotally connected links arranged upon one arm of each of the pendulums and joining the pendulums and rack whereby the rack is controlled to move uniformly during the rocking of the pendulums as successive increments are weighed upon the scale.

9. In a weighing scale, the combination of a pendulum fulcrumed upon fixed bearings, indicating means including a rack, means for restraining the rack to travel in a vertical line, and flexible means carried by the pendulum and connecting the pendulum with the rack to allow the rack to move uniformly in the vertical line during the rocking of the pendulum as successive increments are weighed upon the scale.

10. In a weighing scale, the combination of a pendulum fulcrumed upon fixed bearings, indicating means including a rack, means for restraining the rack to travel in a vertical line, and flexible means carried by the pendulum and connecting the pendulum with the rack whereby the rack is allowed a straight line movement during the angular movement of the pendulum.

11. In a weighing scale, the combination of a pair of opposed pendulums fulcrumed upon fixed bearings, indicating means including a rack, means for restraining the rack to travel in a vertical line, and flexible means carried by the pendulums and connecting the pendulum with the rack whereby the rack is allowed a straight line movement during the angular movement of the pendulums.

12. In a weighing scale, the combination of a pendulum fulcrumed upon fixed bearings, indicating means including a rack, means for restraining the rack to travel in a vertical line, and flexible connecting means arranged between the pendulum and rack whereby the rack is allowed a straight line movement during the angular movement of the pendulum, the distance between the pendulum fulcrum and the point of connection with the rack varying as the secant of the angle traversed by the pendulum arm on either side of its horizontal position.

13. In a weighing scale, the combination of a pendulum fulcrumed upon fixed bearings, indicating means including a rack, and a plurality of links pivotally connecting the pendulum and rack whereby the distance between the pendulum fulcrum and the point of connection of the links with the rack varies as the secant of the angle traversed by the pendulum arm on either side of its horizontal position.

14. In a weighing scale, the combination of a pendulum fulcrumed upon fixed bearings, indicating means including a rack, and a plurality of links pivotally connected to each other and to the pendulum and rack whereby the distance between the pendulum fulcrum and the point of connection of the links with the rack varies as the secant of the angle traversed by the pendulum arm on either side of its horizontal position.

15. In a weighing scale, the combination of a pair of opposed pendulums fulcrumed upon fixed bearings, indicating means including a rack, and a plurality of links pivotally connecting the pendulums and rack whereby the distance between the fulcra of the pendulums and the point of connection of the links with the rack varies as the secant of the angle traversed by the pendulum arms on either side of their horizontal positions.

16. In a weighing scale, the combination of a load-receiver, a two-armed pendulum, fulcrum pivots carried by the pendulums and mounted upon fixed bearings, indicating means including a rack, a pivot upon one arm of the pendulum whereby connection is made to the load-receiver, and a plurality of links pivotally connecting the pendulum and rack, the arrangement being such that the pivot points of the fulcrum and load-supporting pivots are in direct alinement with the point of connection of the links with the rack.

17. In a weighing scale, the combination of a load-receiver, a pendulum having two arms of unequal length, fulcrum pivots carried by the pendulums and mounted upon fixed bearings, indicating means including a rack, a pivot upon the shorter arm of the pendulum whereby connection is made to the load-receiver, and a plurality of links pivotally connecting the pendulum and rack, the arrangement being such that the pivot points of the fulcrum and load-supporting pivots are in direct alinement with the point of connection of the links with the rack.

18. In a weighing scale, the combination of a load-receiver, a pair of opposed two-armed pendulums, fulcrum pivots carried by the pendulums and mounted upon fixed bearings, indicating means including a rack, a pivot upon one arm of each of the pendulums whereby connection is made to the load-receiver, and a plurality of links pivotally connecting the pendulum and rack, the arrangement being such that the pivot points of the fulcrum and load-supporting pivots of each of the pendulum arms are in direct alinement with the point of connection of the links with the rack.

HALVOR O. HEM

Witnesses:
C. F. MILLER, Jr.,
EDW. F. ULRICH.